United States Patent
Cheng

(10) Patent No.: US 7,546,233 B2
(45) Date of Patent: Jun. 9, 2009

(54) SUCCESSION CHINESE CHARACTER INPUT METHOD

(76) Inventor: Yu-Chih Cheng, 3F, No. 15, Lane 45, Longjiang Rd., Taipei County 104 (TW)

( * ) Notice: Subject to any disclaimer, the term of this patent is extended or adjusted under 35 U.S.C. 154(b) by 666 days.

(21) Appl. No.: 11/209,609

(22) Filed: Aug. 24, 2005

(65) Prior Publication Data

US 2007/0050186 A1  Mar. 1, 2007

(51) Int. Cl.
*G06F 17/27* (2006.01)

(52) U.S. Cl. .......................................... 704/8

(58) Field of Classification Search .............. 704/9, 704/8

See application file for complete search history.

(56) References Cited

U.S. PATENT DOCUMENTS

| | | | | |
|---|---|---|---|---|
| 4,937,745 A | * | 6/1990 | Carmon | 715/264 |
| 5,307,267 A | * | 4/1994 | Yang | 715/210 |
| 5,845,300 A | * | 12/1998 | Comer et al. | 715/203 |
| 6,304,844 B1 | * | 10/2001 | Pan et al. | 704/257 |
| 6,377,965 B1 | * | 4/2002 | Hachamovitch et al. | 715/203 |

* cited by examiner

*Primary Examiner*—Susan McFadden
(74) *Attorney, Agent, or Firm*—Ming Chow; Sinorica, LLC

(57) ABSTRACT

A succession Chinese character input method comprising the steps of: (a) inputting a Chinese character, and(b) fetching succession Chinese characters relative to the inputted Chinese character from a database of vocabulary of common succession Chinese characters and/or a database of vocabulary of self-edited succession Chinese characters, (c) and/or displaying fetched succession Chinese characters on a display screen, (d) selecting the desired succession Chinese character from the display screen for input. The database of vocabulary of common succession Chinese characters is prepared by collecting common succession Chinese characters subject to the characteristic that there is a successive relationship between every two concatenate Chinese characters in a Chinese sentence. The database of vocabulary of self-edited succession Chinese characters is prepared by collecting the inputted succession Chinese character which is automatically stored in the database of vocabulary of self-edited succession Chinese characters for further selection. So as to increase the chance of inputting the Chinese characters by selecting Chinese characters from the display screen directly and to achieve a simple, convenient and fast input effect.

4 Claims, 2 Drawing Sheets

SUCCESSION CHINESE CHARACTER INPUT METHOD

BACKGROUND OF THE INVENTION

1. Field of the Invention

The present invention relates to an input method and more particularly, to a succession Chinese character input method, which collects phrases to the database of vocabulary by means of utilizing related Chinese characters placed after the inputted Chinese character and is able to automatically add phrases to the database, increasing the chance of finding the desired Chinese character placed after the inputted Chinese character, i.e., increasing the chance of inputting the Chinese characters by selecting desired Chinese characters from the display screen directly, so as to achieve a simple, convenient and fast input effect.

2. Description of the Related Art

Current Chinese input methods include individual character input methods and phrases input methods. An individual character input methods uses the complicated phonetic alphabet, strokes, or handwriting input method. A phrases input method is relatively simpler. Phrases include common phrases and specific phrases. Upon input of one Chinese character, Some phrase input methods enable a number of phrases that are initiated from the inputted Chinese character to be displayed on the display screen for selection. There are phrases input methods that have phrases encoded with codes by means of a particular encoding method. By means of inputting the respective code, the respective phrase is searched. These phrases input methods reduces the number of individual Chinese character input actions, thereby increasing the input speed. However, because the conventional phrases input methods still need to input a few individual Chinese characters between phrases to link phrases, the input speed is limited. Further, a person who wishes to use the method of using specific codes to search specific phrases needs to take a special learning course and remember specific codes, or has to go through all phrases to search the desired phrase after input of a code. If the desired phrase is not available after input of a code, the user must input every Chinese characters of the phrase one by one. This procedure is complicated and takes much time to complete. Further, the user needs to make phrases by oneself if they are not in the phrase database. In conclusion, the conventional input methods are complicated and slow.

SUMMARY OF THE INVENTION

The present invention has been accomplished under the circumstances in view. It is the main object of the present invention to provide a succession Chinese character input method, which collects a lot of phrases to the database of vocabulary by means of utilizing related Chinese characters placed after the inputted Chinese character and is able to automatically add phrases to the database, increasing the chance of finding the desired Chinese character to be placed after the inputted Chinese character, i.e., increasing the chance of inputting the Chinese characters by selecting desired Chinese characters from the display screen directly, so as to achieve a simple, convenient and fast input effect.

To achieve this and other objects of the present invention, the succession Chinese character input method includes the steps of: fetching related succession Chinese characters from the database of vocabulary of common succession Chinese characters and/or the database of vocabulary of self-edited succession Chinese characters and/or displaying the fetched succession Chinese characters for input selection after the input of one Chinese character.

In the aforesaid succession Chinese character input method, the database of vocabulary of common succession Chinese characters is prepared by collecting common succession Chinese characters subject to the characteristic that there is a successive relationship between every two concatenate Chinese characters in a Chinese sentence.

In the aforesaid succession Chinese character input method, the database of vocabulary of self-edited succession Chinese characters is prepared by collecting the inputted succession Chinese character which is automatically stored in the database of vocabulary of self-edited succession Chinese characters for further selection when no succession Chinese character was obtained from the database of vocabulary of common succession Chinese characters after input of one Chinese character.

In the aforesaid succession Chinese character input method, the means of displaying the fetched succession Chinese characters for input selection after the input of one Chinese character is to display fetched succession Chinese characters continuously without space, or to display fetched succession Chinese characters with a space or symbol or number or alphabet put in between each two fetched succession Chinese characters, or to display fetched succession Chinese characters by means of a two-dimensional array and to mark the coordinates of the fetched succession Chinese characters with numbers or symbols or alphabets, or to display fetched succession Chinese characters by means of using symbols or numbers or alphabets to mark the locations of the characters, or to display fetched succession Chinese characters by means of dividing into a plurality of pages if the unmber of said characters is too large to be displayed once, or to display fetched succession Chinese characters by means of any of a variety of other character string displaying methods.

In the aforesaid succession Chinese character input method, the input selection is to select displayed succession Chinese character by means of keyboard instrument, or pointing devices such as mouse, or any of a variety of other selection methods.

In the aforesaid succession Chinese character input method, the sequence of displaying succession Chinese characters of inputted character in such a manner the recently selected succession Chinese character of the same inputted character will be displayed on the first place for selection.

The invention further provides an electronic product for the application of the aforesaid succession Chinese character input method.

The technical measure of the present invention to eliminate the drawbacks of the aforesaid conventional methods is as follows: Prepare a database of vocabulary of common succession Chinese characters by: gathering a certain amount of Chinese writings and sentences and analyzing the writings and sentences to collecting pairs of common succession Chinese characters subject to the characteristic that there is a successive relationship between every two concatenate Chinese characters in a Chinese sentence and subject to the order that the pair of Chinese characters that is more frequently appeared is put at the front side and the pair of Chinese characters that is less frequently appeared is put at the rear side. After input of a first Chinese character, search all available succession characters from the database of vocabulary of common succession Chinese characters and display searched succession Chinese characters on the display screen for selection. If the desired second Chinese character is not available in the database of vocabulary of common succession Chinese characters, input this second Chinese character by input device and store in the database of vocabulary of self-edited succession Chinese characters in the place corresponding to the inputted first Chinese character so as to automatically add the self-edited succession Chinese character to the database of vocabulary of self-edited succession Chinese characters for further search. In a further next search after input of the same first Chinese character, the recently added succession Chinese character will be displayed on the first place for selection subject to the user's habit of use of words and phrases. After input of a second Chinese character, repeat the aforesaid procedure to search the desired third Chinese character, and so on. The more the input Chinese characters are, the more the self-edited succession Chinese characters accumulated in the database of vocabulary of self-edited succession Chinese characters will be, so as to increase the chance of inputting the Chinese characters by selecting desired Chinese characters from the display screen directly and improve input speed as well.

Thus, during the input process, self-edited succession Chinese characters will be automatically added to the vocabulary of self-edited succession Chinese characters without phrases making. Therefore, the invention greatly increases the chance of finding the succession Chinese character, and the user can directly select the succession Chinese character from the display screen for input after input of one single Chinese character, improving the input speed. Further, because succession Chinese characters can be directly selected from the display screen for input, the user needs not to memory succession characters or to input the code of phrase in order to find the words or phrases. In general, the invention simplifies the input operation, and greatly improves the input speed.

DETAILED DESCRIPTION OF THE PREFERRED EMBODIMENT

The invention can be carried out in different embodiments. However, various modifications and enhancements may be made without departing from the spirit and scope of the invention. Any modifications or similar arrangements and procedures are included in the scope of the appended claims and should be accorded the broadest interpretation so as to encompass all such modifications and similar arrangements and procedures.

EXAMPLE I

Figure 1:
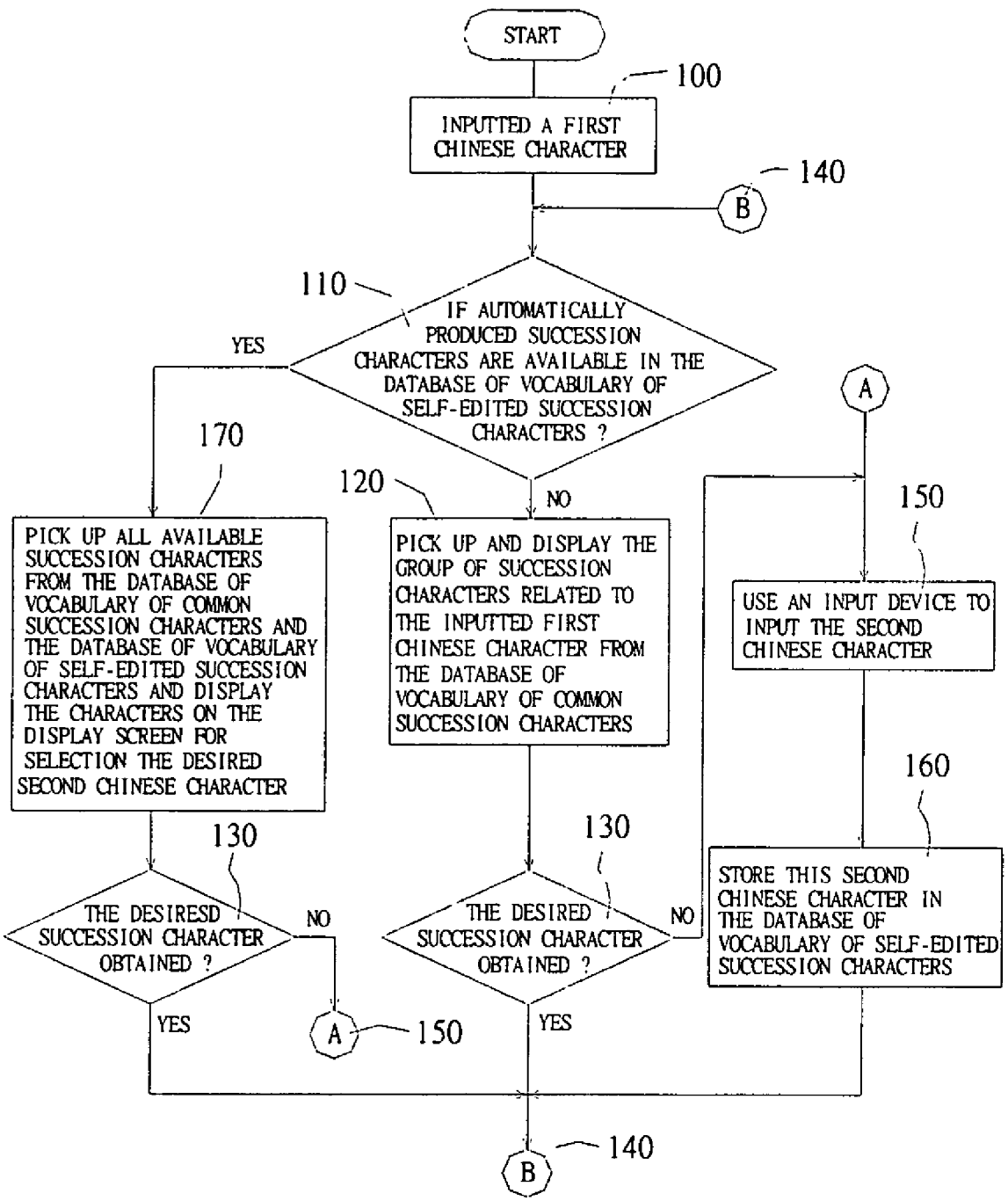
FIG. 1 is a succession Chinese character input flow chart according to Example I of the present invention.

FIG. 1 is a Chinese character input processing flow chart of the present invention. When inputted a first Chinese character (100), judge if automatically produced succession Chinese characters are available in the database of vocabulary of self-edited succession Chinese characters (110). If that are not available, and then pick up and display the group of succession Chinese characters related to the inputted first Chinese character from the database of vocabulary of common succession Chinese characters (120) for selection. When the desired succession Chinese character obtained (130), complete this input and keep searching the succession Chinese characters of the second Chinese character (140). If the desired succession Chinese character is not available in the database of vocabulary of common succession Chinese characters after input of the fist Chinese character, use an input device to input the second Chinese character (150) and simultaneously store this second Chinese character in the database of vocabulary of self-edited succession Chinese characters (160) to complete this input and then search the succession Chinese characters of the second Chinese character (140). If the database of vocabulary of self-edited succession Chinese characters has succession Chinese characters corresponding to the inputted first Chinese character, pick up all available succession Chinese characters from the database of vocabulary of common succession Chinese characters and the database of vocabulary of self-edited succession Chinese characters and display the succession Chinese characters on the display screen for selection the desired second Chinese character (170). This input procedure is completed when the desired succession Chinese character is obtained (130). Thereafter, keep searching the succession Chinese character corresponding to the inputted second Chinese character (140). Otherwise use the input device to input the second Chinese character if the succession Chinese character is not found at this time (150), and then automatically store this second Chinese character in the database of vocabulary of self-edited succession Chinese characters at the place corresponding to the inputted first Chinese character (160) to complete this input procedure, and then keep searching the succession Chinese character corresponding to this second Chinese character (140).

EXAMPLE II

Figure 2:
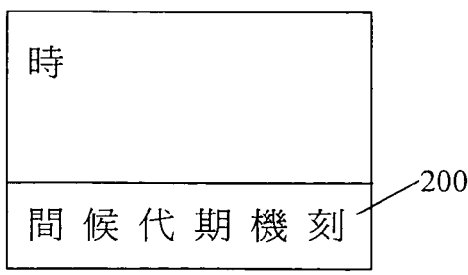
FIG. 2 shows a common succession Chinese character string appeared with the input Chinese character "時" according to Example II of the present invention.
Figure 3:
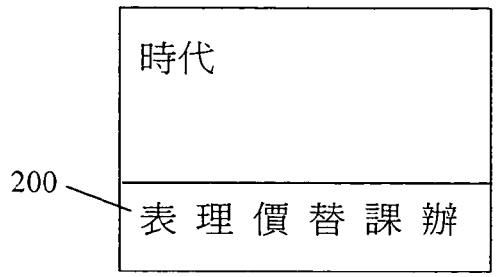
FIG. 3 corresponds to FIG. 2 but showing the succession Chinese character "代" selected and appeared after the place of inputted Chinese character "時".
Figure 4:
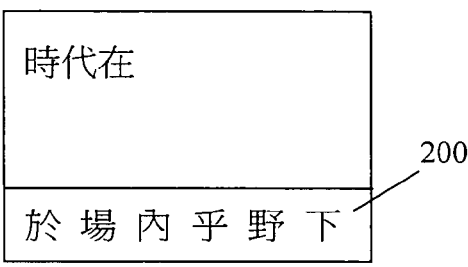
FIG. 4 corresponds to FIG. 3 but showing the succession Chinese character "在" selected and appeared after the place of the displayed phrase "時代".
Figure 5:
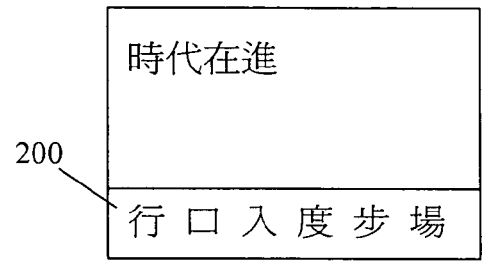
FIG. 5 corresponds to FIG. 4 but showing the succession Chinese character "進" selected and appeared after the place of the displayed phrase "時代在".
Figure 6:
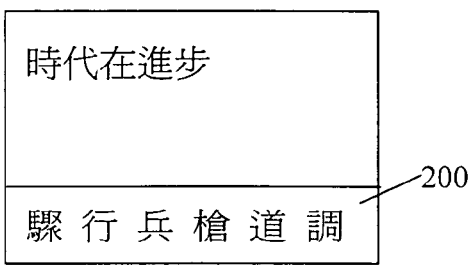
FIG. 6 corresponds to FIG. 5 but showing the succession Chinese character "步" selected and appeared after the place of the displayed phrase "時代在進".

When inputting the sentence "時代在進步" in which "時代" and "進步" are common Chinese phrases, the related existing input technique is as follows:

1. Input "時", and then list common Chinese phrases having the initial "時" (200), as shown in FIG. 2;

2. Select "代" from the bottom row of Chinese characters (200) in FIG. 2 to complete the input of the common Chinese phrase "時代", and then list common Chinese phrases having the initial "代" (200), as shown in FIG. 3;

3. Because "代在" is not a common Chinese phrase, the Chinese character "在" cannot be found in the bottom row of Chinese characters (200) in FIG. 3, and the Chinese character "在" must be separately inputted as shown in FIG. 4, and in the same way, list common Chinese phrases having the initial "在" (200) as shown in FIG. 4;

4. Because "在進" is not a common Chinese phrase, the Chinese character "進" cannot be found in the bottom row of Chinese characters (200) in FIG. 4, and the Chinese character "進" must be separately inputted as shown in FIG. 5, and in the same way, list common Chinese phrases having the initial "進" (200) as shown in FIG. 5; and 5. Select "步" from the bottom row of Chinese characters (200) in FIG. 5 to complete the input of the common Chinese phrase "進步" and then list common Chinese phrases having the initial "步" (200) to complete the input as shown in FIG. 6.

According to the aforesaid conventional technique, it needs to perform complicated individual Chinese character input procedure three times and simple display screen selection and input procedure two times.

Figure 7:
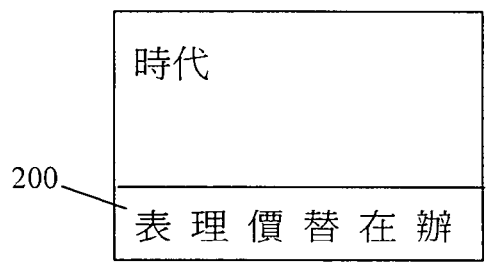
FIG. 7 corresponds to FIG. 2, showing a list of succession Chinese characters following the Chinese character "代" for selection after selection of the succession Chinese character "代".
Figure 8:
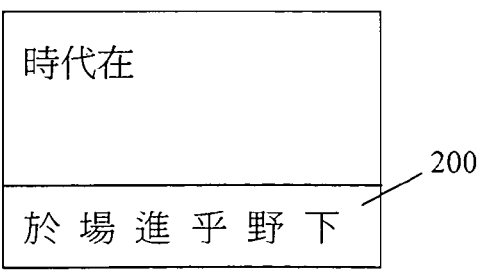
FIG. 8 corresponds to FIG. 7, showing a list of succession Chinese characters following the Chinese character "在" for selection after selection of the succession Chinese character "在".

According to the present invention, the Chinese phrases "代在" and "在進" are automatically added to the database of vocabulary of self-edited succession Chinese characters, therefore the input procedure is greatly simplified as follow:

1. Input "時" and then list the related succession Chinese characters corresponding to "時" (200), as shown in FIG. 2;

2. Select "代" from the bottom row of succession Chinese characters (200) in FIG. 2 to complete the input of "時 代", and then list the related succession Chinese characters corresponding to "代" (200), as shown in FIG. 7;

3. Select "在" from the bottom row of succession Chinese characters (200) in FIG. 7 to complete the input of "代 在", and then list the related succession Chinese characters corresponding to "在" (200) as shown in FIG. 8;

4. Select "進" from the bottom row of succession Chinese characters (200) in FIG. 8 to complete the input of "在 進", and then list the related succession Chinese characters corresponding to "進" (200) as shown in FIG. 5; and 5. Select "步" from the bottom row of Chinese characters (200) in FIG. 5 to complete the input of "進步", and then list the related succession Chinese characters having the initial "步" (200) to complete the input as shown in FIG. 6.

Figure 9:
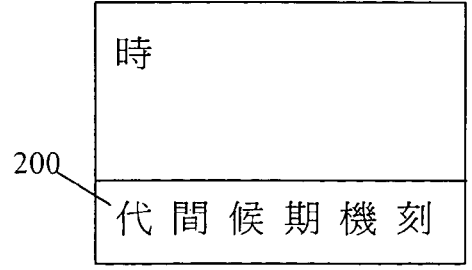
FIG. 9 shows a list of succession Chinese characters appeared in such an order that the succession character "代" is at the first place for selection after a secondary input of the Chinese character "時".

Further, in order to improve the succession Chinese character selection efficiency, the ever selected succession Chinese character will be appeared on the first place in the list of related succession Chinese characters after input of the same related Chinese character as shown in FIG. 2 and FIG. 9 Chinese character "代".

In comparison with the aforesaid conventional input technique, the invention completes the input by means of one complicated individual Chinese character input procedure and four simple display screen selection and input procedures. Obviously, the invention shows great speed improvement compared with the aforesaid conventional input technique What the invention claimed is:

1. A succession Chinese character input method comprising the steps of: (a) inputting a Chinese character, and (b) fetching succession Chinese characters relative to the inputted Chinese character from a database of vocabulary of common succession Chinese characters and/or a database of vocabulary of self-edited succession Chinese characters, (c) and/or displaying fetched succession Chinese characters on a display screen, (d) selecting the desired succession Chinese character from the display screen for input;

said database of vocabulary of common succession Chinese characters is prepared by collecting common succession Chinese characters subject to the characteristic that there is a successive relationship between every two concatenate Chinese characters in a Chinese sentence; and said database of vocabulary of self-edited succession Chinese characters is prepared by collecting the inputted succession Chinese character which is automatically stored in the database of vocabulary of self-edited succession Chinese characters for further selection when no succession Chinese character was obtained from the database of vocabulary of common succession Chinese characters after input of one Chinese character.

2. The succession Chinese character input method as claimed in claim 1, wherein said step (c) of displaying fetched succession Chinese characters on a display screen is to display succession Chinese characters of inputted character in such a manner the recently selected succession Chinese character of the same inputted character will be displayed on the first place for selection.

3. The succession Chinese character input method as claimed in claim 1, wherein said step (d) of selecting the desired succession Chinese character from the display screen for input is by means of keyboard instrument, or pointing devices such as mouse, or any of a variety of other selection methods to select the desired succession Chinese character from the display screen for input.

4. The succession Chinese character input method as claimed in claim 1, wherein said step (c) of displaying fetched succession Chinese characters is to display fetched succession Chinese characters continuously without space, or to display fetched succession Chinese characters with a space or symbol or number or alphabet put in between each two fetched succession Chinese characters, or to display fetched succession Chinese characters by means of a two-dimensional away and to mark the coordinates of the fetched succession Chinese characters with numbers or symbols or alphabets, or to display fetched succession Chinese characters by means of using symbols or numbers or alphabets to mark the locations of the characters, or to display fetched succession Chinese characters by means of dividing into a plurality of pages if the number of said characters is too large to be displayed once, or to display fetched succession Chinese characters by means of any of a variety of other character string displaying methods.

* * * * *